US011533664B2

(12) United States Patent
Lee et al.

(10) Patent No.: US 11,533,664 B2
(45) Date of Patent: Dec. 20, 2022

(54) METHOD AND APPARATUS FOR WIFI HANDOFF VIA COORDINATION IN WIRELESS COMMUNICATION SYSTEM

(71) Applicants: Samsung Electronics Co., Ltd., Gyeonggi-do (KR); Seoul National University R&DB Foundation, Seoul (KR)

(72) Inventors: Mingyu Lee, Gyeonggi-do (KR); Sunghyun Choi, Seoul (KR); Junyoung Choi, Seoul (KR); Gyujin Lee, Seoul (KR)

(73) Assignees: Samsung Electronics Co., Ltd; Seoul National University R&DB Foundation

( * ) Notice: Subject to any disclaimer, the term of this patent is extended or adjusted under 35 U.S.C. 154(b) by 20 days.

(21) Appl. No.: 17/254,083

(22) PCT Filed: Jun. 19, 2019

(86) PCT No.: PCT/KR2019/007406
§ 371 (c)(1),
(2) Date: Dec. 18, 2020

(87) PCT Pub. No.: WO2020/004861
PCT Pub. Date: Jan. 2, 2020

(65) Prior Publication Data
US 2021/0266805 A1    Aug. 26, 2021

(30) Foreign Application Priority Data
Jun. 26, 2018  (KR) .................. 10-2018-0073655

(51) Int. Cl.
*H04W 36/08*  (2009.01)
*H04W 36/00*  (2009.01)
(Continued)

(52) U.S. Cl.
CPC ....... *H04W 36/08* (2013.01); *H04W 36/0005* (2013.01); *H04W 36/36* (2013.01); *H04W 88/10* (2013.01)

(58) Field of Classification Search
CPC ............. H04W 36/36; H04W 36/0005; H04W 36/08; H04W 88/10; H04W 52/0251
See application file for complete search history.

(56) References Cited

U.S. PATENT DOCUMENTS 10,440,220 B2   10/2019  Yasuzaki
2013/0178163 A1  7/2013  Wang
(Continued)

FOREIGN PATENT DOCUMENTS

EP   3 213 560     10/2015
JP   2017-143389   8/2017
(Continued)

OTHER PUBLICATIONS

International Search Report dated Sep. 26, 2019 issued in counterpart application No. PCT/KR2019/007406, 20 pages.
Korean Office Action dated Jan. 21, 2022 issued in counterpart application Na. 10-2018-0073655, 12 pages.

*Primary Examiner* — Shukri Taha
(74) *Attorney, Agent, or Firm* — The Farrell Law Firm, P.C.

(57) ABSTRACT

Provided is a method and apparatus for performing a Wireless Fidelity (WiFi) handoff through coordination in a wireless communication system. A first access point (AP) device that transmits a first Bluetooth Low Energy (BLE) advertising packet sets a transmission period identically for the first BLE advertising packet and a second BLE advertising packet, determines transmission timings of the first BLE advertising packet and the second BLE advertising packet, transmits a setting message comprising information about the set transmission period of the second BLE advertising (Continued)

packet and information about the determined transmission timing of the second BLE advertising packet to the second AP device, transmits the first BLE advertising packet to a terminal, and performs a WiFi connection with the terminal, based on a determination by the terminal.

15 Claims, 14 Drawing Sheets

(51) Int. Cl.
*H04W 36/36* (2009.01)
*H04W 88/10* (2009.01)

(56) References Cited

U.S. PATENT DOCUMENTS

| | | |
|---|---|---|
| 2015/0382304 A1 | 12/2015 | Park |
| 2017/0055236 A1 | 2/2017 | Levesque et al. |
| 2017/0280298 A1 | 9/2017 | Mycek et al. |
| 2018/0069606 A1 | 3/2018 | Jung et al. |
| 2018/0184380 A1 | 6/2018 | Xue |
| 2021/0266805 A1* | 8/2021 | Lee ..................... H04W 8/005 |

FOREIGN PATENT DOCUMENTS

| | | |
|---|---|---|
| KR | 1020180012269 | 2/2018 |
| KR | 1020180027305 | 3/2018 |
| WO | WO 2013/184110 | 12/2013 |
| WO | WO 2016/069372 | 5/2016 |

\* cited by examiner

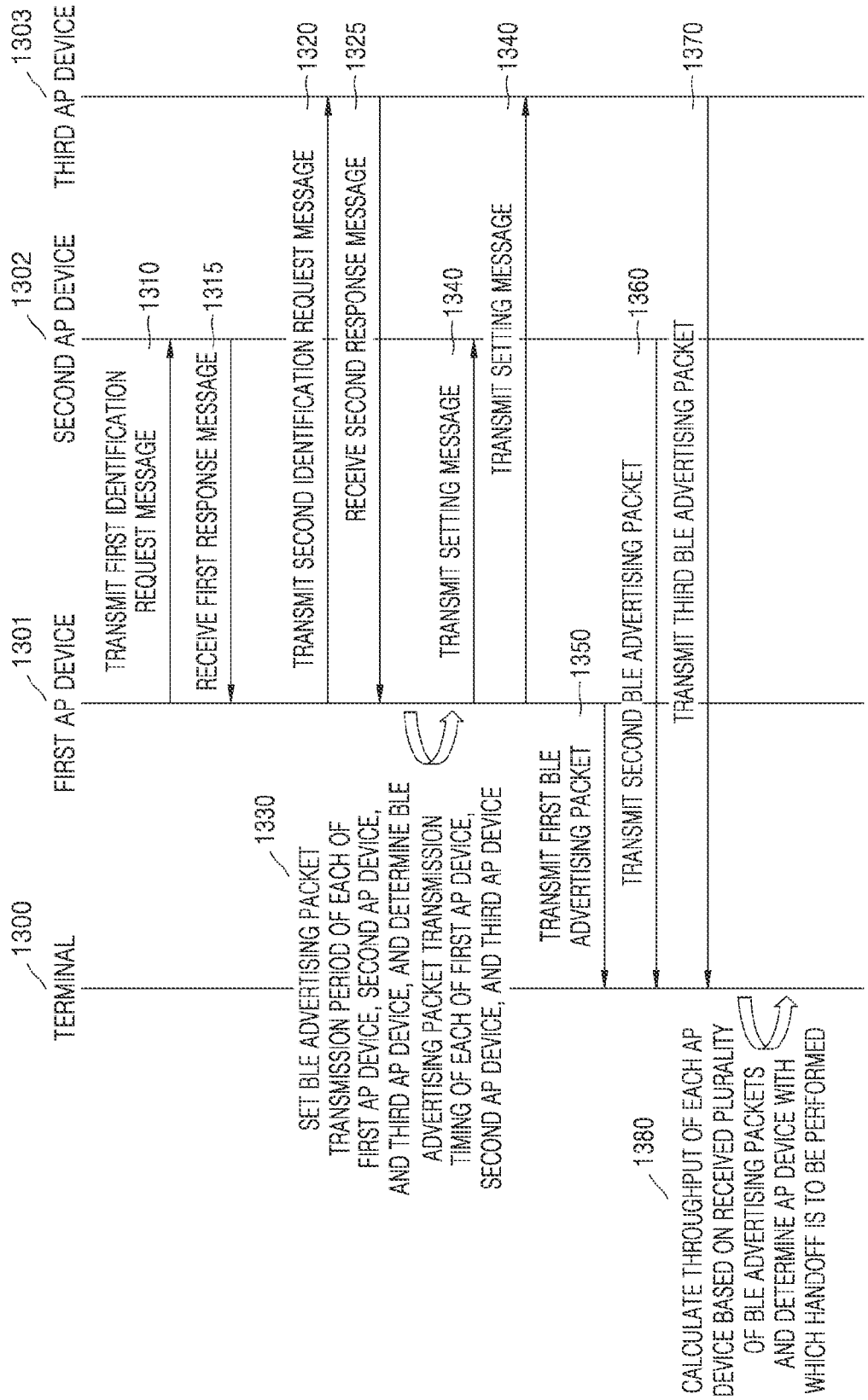

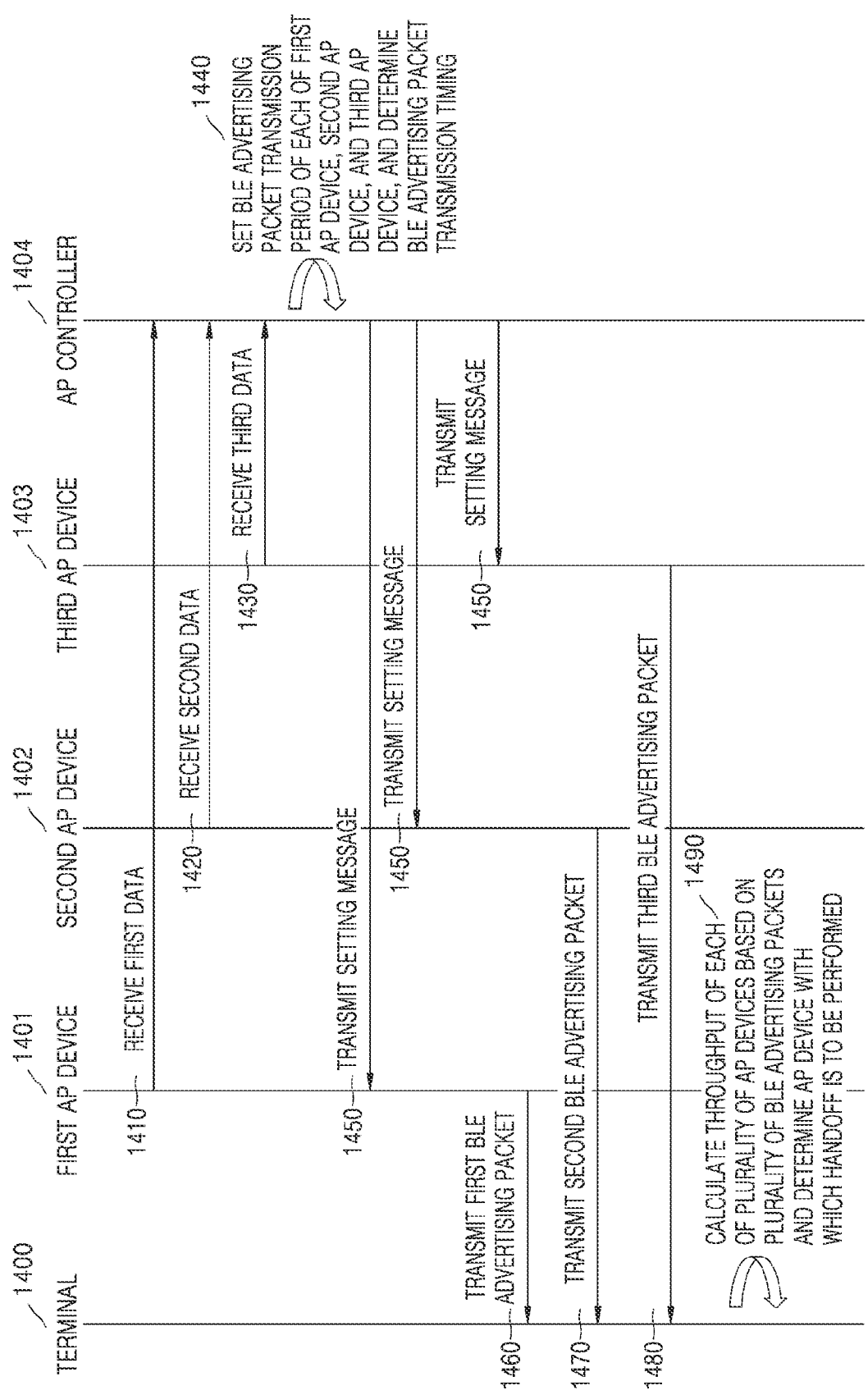

METHOD AND APPARATUS FOR WIFI HANDOFF VIA COORDINATION IN WIRELESS COMMUNICATION SYSTEM

PRIORITY

This application is a National Phase Entry of PCT International Application No. PCT/KR2019/007406 which was filed on Jun. 19, 2019, and claims priority to Korean Patent Application No. 10-2018-0073655, which were filed on Jun. 26, 2018, the content of each of which is incorporated herein by reference.

TECHNICAL FIELD

The disclosure relates to a method and apparatus for performing a wireless fidelity (WiFi) handoff through coordination in a wireless communication system.

BACKGROUND ART

Generally, to perform a wireless fidelity (WiFi) handoff, a terminal scans an access point (AP) device for the handoff through WiFi scanning. A surrounding network environment changes as the terminal moves, such that when a handoff with another AP device is favorable, the terminal may not be properly performing WiFi scanning and may not perform a handoff even when performing the scanning. As such, even in the situation favorable to a handoff of the terminal, the terminal may not perform the handoff and maintain connection with the current AP apparatus. This problem is referred to as a sticky client problem.

To solve this problem, it is necessary to provide information of a nearby AP in case of absence of WiFi scanning so as to trigger a handoff.

DESCRIPTION OF EMBODIMENTS

Technical Problem

Various embodiments of the disclosure provide a method and apparatus for performing a wireless fidelity (WiFi) handoff in a wireless communication system. Additional aspects will be set forth in part in the description which follows and, in part, will be apparent from the description, or may be learned by practice of the presented embodiments of the disclosure.

BRIEF DESCRIPTION OF DRAWINGS

FIG. 13 is a signal flow of an AP system according to an embodiment of the disclosure; and FIG. 14 is a signal flow of an AP system according to an embodiment of the disclosure.

MODE OF DISCLOSURE

Figure 1:
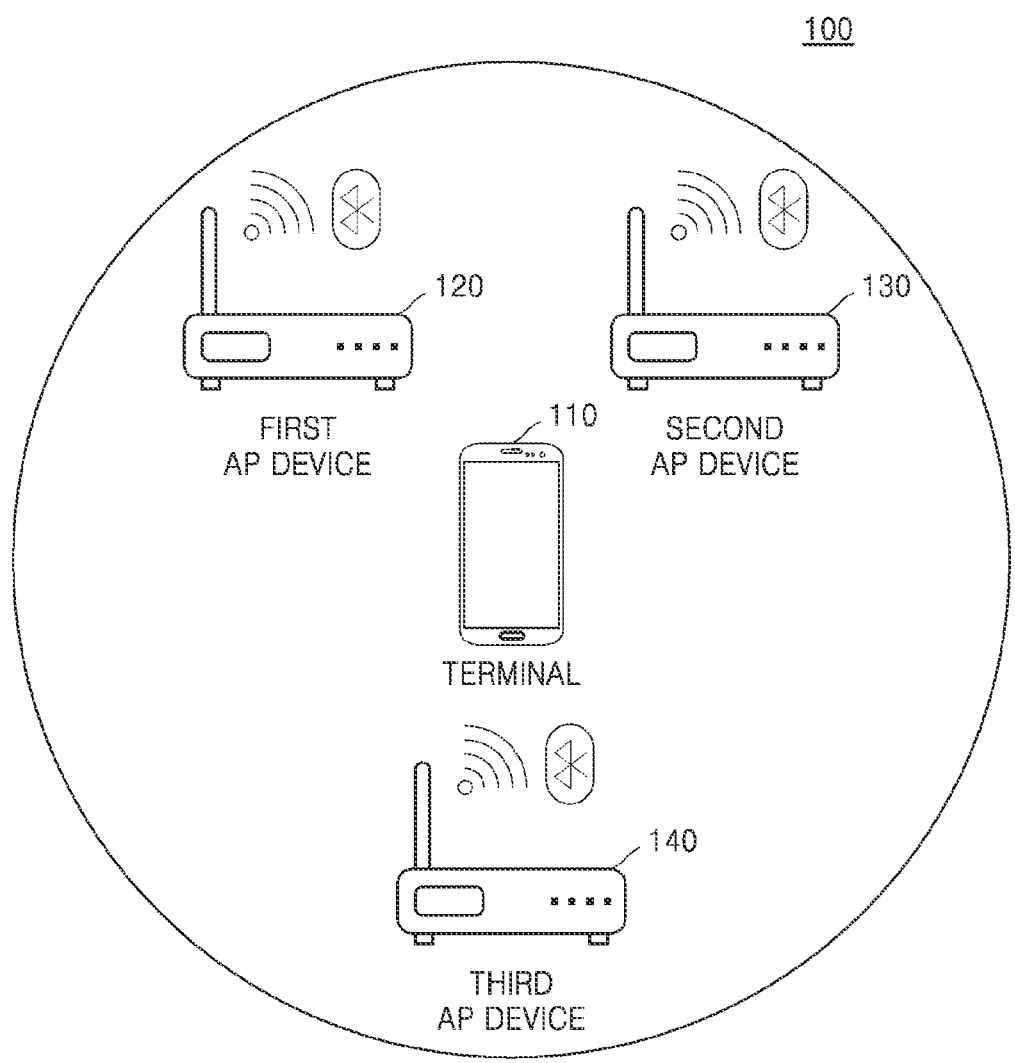
FIG. 1 is a diagram of an access point (AP) system according to an embodiment of the disclosure.

A first access point (AP) device according to a first aspect of the disclosure includes a communicator including a first communication module configured to transmit a first Bluetooth Low Energy (BLE) advertising packet and a second communication module configured to perform a Wireless Fidelity (WiFi) connection with the terminal based on a determination of a terminal, a controller configured to set a transmission period identically for the first BLE advertising packet and a second BLE advertising packet of a second AP device and to determine transmission timings of the first BLE advertising packet and the second BLE advertising packet, and a memory, in which the first communication module or the second communication module is configured to transmit a setting message including information about the set transmission period of the second BLE advertising packet and information about the determined transmission timing of the second BLE advertising packet to the second AP device. The controller may be configured to determine transmission orders of the first BLE advertising packet and the second BLE advertising packet and determine the transmission timings to transmit the first BLE advertising packet and the second BLE advertising packet at time intervals within the identically set transmission period according to the determined transmission orders.

The controller may be configured to determine transmission orders of the first BLE advertising packet and the second BLE advertising packet and determine the transmission timings to transmit the first BLE advertising packet and the second BLE advertising packet at time intervals within the identically set transmission period according to the determined transmission orders.

The first communication module or the second communication module may be configured to transmit an identification request message to the second AP device and receive from the second AP device, a response message in response to the transmitted identification request message, and the controller may be configured to identify the second AP device based on the received response message. The identification request message and the response message may be transmitted through a BLE advertising packet or a WiFi beacon.

The controller may be configured to set at least one identified AP device including the identified second AP device into one AP group, and the one AP group may be coordinated by the first AP device.

The controller may set the transmission period identically for the first BLE advertising packet and the second BLE advertising packet based on information about a transmission period for the second BLE advertising packet, included in the received response message.

A method of coordinating BLE advertising packet transmission with a second AP device that transmits a second BLE advertising packet, performed by a first AP device that transmits a first BLE advertising packet according to a second aspect of the disclosure includes setting a transmission period identically for the first BLE advertising packet and the second BLE advertising packet, determining transmission timings of the first BLE advertising packet and the second BLE advertising packet, transmitting a setting message including information about the set transmission period of the second BLE advertising packet and information about the determined transmission timing of the second BLE advertising packet to the second AP device, transmitting the first BLE advertising packet to a terminal, and performing a WiFi connection with the terminal, based on a determination by the terminal.

A terminal according to a third aspect of the disclosure includes a communicator including a first communication module configured to receive a plurality of BLE advertising packets from a plurality of AP devices and a second communication module configured to perform a WiFi connection, a handoff determiner configured to calculate a throughput of each of the plurality of AP devices, based on information about each of the plurality of AP devices, the information being included in each of the plurality of BLE advertising packets, and to determine an AP device with which the WiFi connection is to be performed, among the plurality of AP devices, based on the calculated throughput of each of the plurality of AP devices, and a memory, in which the second communication module is configured to perform a WiFi handoff based on the determining of the AP device with which the WiFi connection is to be performed.

The handoff determiner may be configured to calculate a WiFi reception power of each of the plurality of AP devices based on a BLE received signal strength indicator (RSSI) of each of the plurality of AP devices, the BLE RSSI being included in each of the received plurality of BLE advertising packets, and calculate the throughput of each of the plurality of AP devices based on the WiFi reception power of each of the plurality of AP devices.

A method, performed by a terminal, of performing a handoff with an AP device according to a fourth aspect of the disclosure includes receiving a plurality of BLE advertising packets from a plurality of AP devices, calculating a throughput of each of the plurality of AP devices based on information about each of the plurality of AP devices, the information being included in each of the received plurality of BLE advertising packets, determining based on the calculated throughput of each of the plurality of AP devices, an AP device with which a WiFi connection is to be performed, among the plurality of AP devices, and performing the WiFi connection, based on the determining of the AP device with which the WiFi connection is to be performed.

FIG. 1 is a diagram of an access point (AP) system according to an embodiment of the disclosure.

According to an embodiment of the disclosure, the AP system 100 may include a terminal 110 and AP devices 120 through 140. The terminal 110 may perform wireless fidelity (WiFi) connection with one of the AP devices 120 through 140 included in the AP system 100.

According to an embodiment of the disclosure, the AP devices 120 through 140 may provide information for WiFi connection to the terminal 110 through a Bluetooth Low Energy (BLE) advertising packet. The terminal 110 may determine whether to perform a WiFi handoff based on the information for WiFi connection, received from the AP devices 120 through 140.

The terminal 110 may include a communication module capable of performing BLE communication. The AP devices 120 through 140 may include a module capable of performing BLE communication. Thus, the terminal 110 may perform a handoff with another AP device by predicting and calculating a throughput of each AP device based on the information for WiFi connection, received from the AP devices 120 through 140, even without WiFi scanning.

When the terminal 110 receives the information for WiFi connection from each of the AP devices 120 through 140, the terminal 110 may skip WiFi scanning for all WiFi channels. Hence, when compared to the handoff performed through WiFi scanning, power consumption of the terminal 110 may be reduced and a handoff delay may be reduced due to absence of a scanning delay.

However, a BLE advertising packet transmission period, a BLE advertising packet transmission order, and a BLE advertising packet transmission timing may differ from AP device to AP device among the AP devices 120 through 140, such that much time may be required until the terminal 110 receives a BLE advertising packet including information needed for a WiFi handoff from all of the AP devices 120 through 140 and the handoff of the terminal 110 may be delayed as long as the required time.

According to an embodiment of the disclosure, BLE advertising packet transmission of the AP devices 120 through 140 included in the AP system 100 is coordinated, thus improving a handoff delay.

Coordination refers to control and adjustment, and coordination of BLE advertising packet transmission of the AP devices 120 through 140 may mean setting a BLE advertising packet transmission period and a BLE advertising packet transmission timing of each of the AP devices 120 through 140. Hereinbelow, for convenience of a description, BLE advertising packet advertisement coordination of AP devices will be briefly referred to as AP coordination.

According to an embodiment of the disclosure, a BLE advertising packet transmission period may be set by an AP device including a BLE communication module. For example, a BLE advertising packet transmission period may be set to a multiple of 0.625 ms between 20 ms and 10.24 s as prescribed in the BLE standards. However, the disclosure is not limited to the above example, and the BLE advertising packet transmission period may be set differently with each AP device.

According to an embodiment of the disclosure, AP coordination may be performed by a device playing a role of a coordinator. The coordinator role of AP coordination according to an embodiment of the disclosure may be performed by one of the AP devices 120 through 140 included in the AP system 100. According to an embodiment of the disclosure, AP coordination may be performed as the AP devices 120 through 140 included in the AP system 100 play the role of the coordinator in a divided manner.

Figure 2:
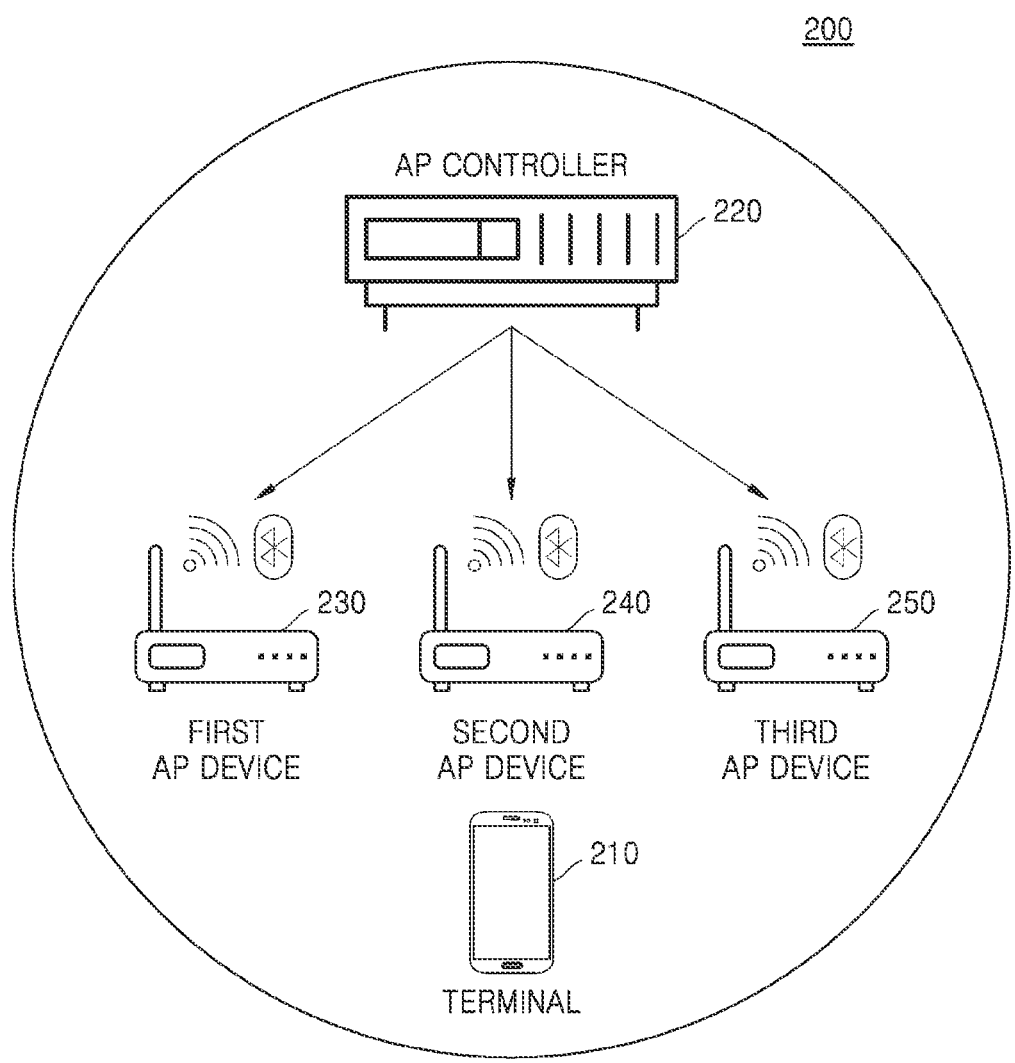
FIG. 2 is a diagram of an AP system in which an AP controller exists, according to an embodiment of the disclosure.

FIG. 2 is a diagram of an AP system in which an AP controller exists according to an embodiment of the disclosure.

According to an embodiment of the disclosure, an AP system 200 may include a terminal 210, an AP controller 220, and AP devices 230 through 250. Herein, the terminal 210 and the AP devices 230 through 250 may correspond to the terminal 110 and the AP devices 120 through 140 of FIG. 1, respectively.

According to an embodiment of the disclosure, the AP controller 220 may be connected to the AP devices 230 through 250 and play a coordinator role of AP coordination of the AP devices 230 through 250. Thus, the coordinator role of AP coordination performed by any one AP device or AP devices in FIG. 1 may be performed by the AP controller 220 that is a separate device, in place of the AP device. The AP controller 220 may be a device existing in a wired network connected with the AP devices 230 through 250 and may include a device that is connected with at least one of the AP devices 230 through 250 and does not play an AP role, without being limited to the above-described example. That is, AP coordination may be performed directly by a device playing an AP role or a device other than an AP device.

Figure 3:
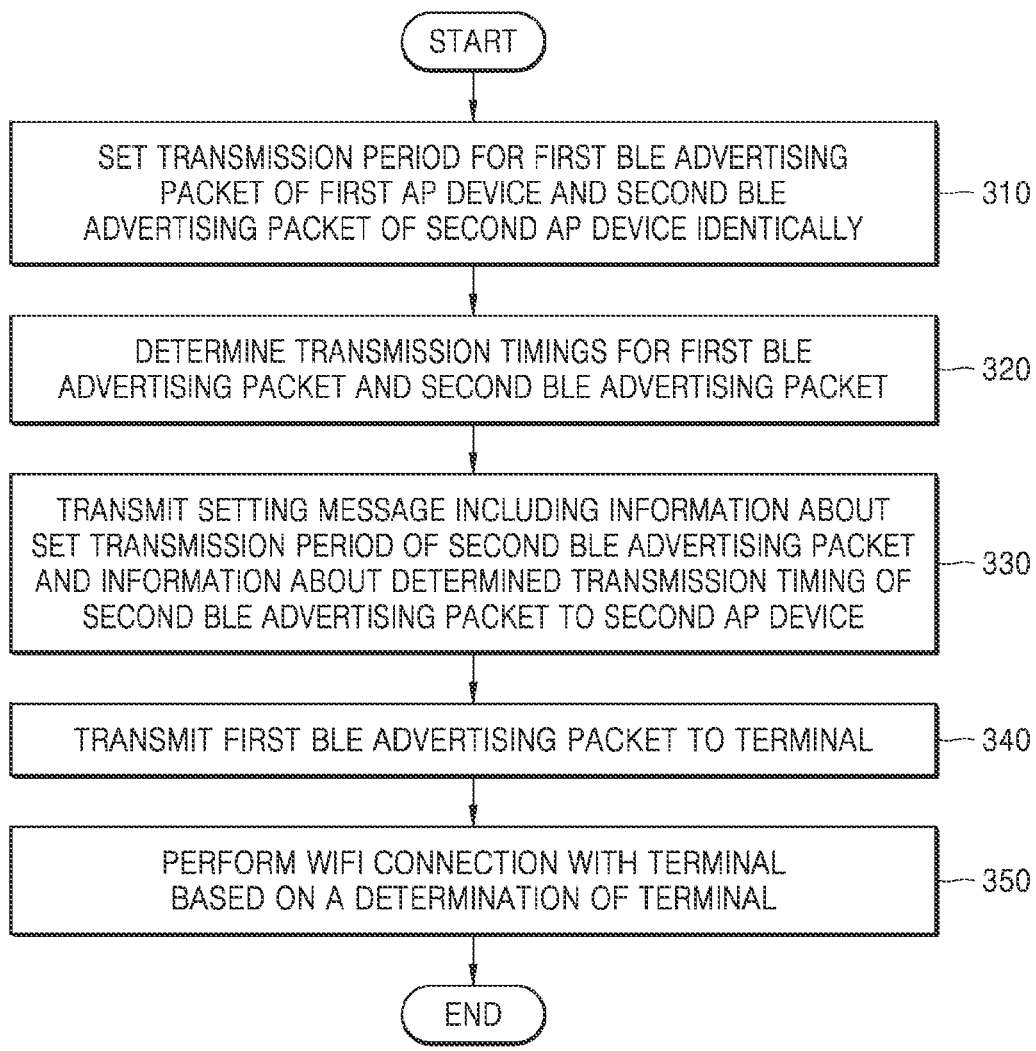
FIG. 3 is a flowchart of an AP coordination method according to an embodiment of the disclosure.

FIG. 3 is a flowchart of an AP coordination method according to an embodiment of the disclosure. A description will be made assuming that a first AP device performs a coordinator role of AP coordination in FIG. 3.

In operation 310, the first AP device may set the transmission period identically for a first BLE advertising packet of the first AP device and a second BLE advertising packet of a second AP device.

According to an embodiment of the disclosure, the first AP device may set the transmission period identically for the first BLE advertising packet to be transmitted from the first AP device to the terminal and the second BLE advertising packet to be transmitted from the second AP device to the terminal.

According to an embodiment of the disclosure, the transmission period of the first BLE advertising packet of the first AP device and the transmission period of the second BLE advertising packet of the second AP device may be set previously in each AP device. The first AP device may set the transmission period identically for the corresponding BLE advertising packet, which is set in each AP device. According to an embodiment of the disclosure, the first AP device may set the transmission period identically for the first BLE advertising packet of the first AP device and the second BLE advertising packet of the second AP device to a multiple of 0.625 ms between 20 ms and 10.24 s according to the BLE standards.

According to an embodiment of the disclosure, the first AP device may set a BLE advertising packet transmission period, considering power consumption of the first AP device and the second AP device. When the BLE advertising packet transmission period is set short, power consumed by BLE advertising packet advertisement in the AP device may increase. Thus, the first AP device may set an transmission period for the first BLE advertising packet and the second BLE advertising packet based on power consumption.

In operation 320, the first AP device may determine transmission timings of the first BLE advertising packet and the second BLE advertising packet.

According to an embodiment of the disclosure, the first AP device may determine the transmission timings of the first BLE advertising packet and the second BLE advertising packet to transmit the first BLE advertising packet and the second BLE advertising packet within a preset time. For example, the first AP device may determine the transmission timings of the first BLE advertising packet and the second BLE advertising packet to transmit the second BLE advertising packet within a preset time from transmission of the first BLE advertising packet within the identically set transmission period for the BLE advertising packets.

When the first AP device and the second AP device transmit the BLE advertising packets to the terminal according to the transmission timings determined by the first AP device, the first BLE advertising packet and the second BLE advertising packet may be transmitted from the first AP device and the second AP device to the terminal, respectively, with an interval therebetween in each same period.

The terminal may receive a BLE advertising packet from both an AP device and an external AP device within a time. Thus, the terminal may receive BLE advertising packets of the first AP device and the second AP device in single BLE advertising packet scanning.

In operation 330, the first AP device may transmit a setting message including information about the set transmission period of the second BLE advertising packet and information about the determined transmission timing of the second BLE advertising packet to the second AP device.

According to an embodiment of the disclosure, the first AP device may transmit a setting message including information about the transmission period of the second BLE advertising packet, which is set the same as that of the first BLE advertising packet, and information about the determined transmission timing of the second BLE advertising packet to the second AP device. In other words, the first AP device may perform coordination to cause the second AP device to transmit the second BLE advertising packet to the terminal according to the set transmission period of the second BLE advertising packet and the determined transmission timing of the second BLE advertising packet based on the setting message.

In operation 340, the first AP device may transmit the first BLE advertising packet to the terminal.

According to an embodiment of the disclosure, the first BLE advertising packet transmitted by the first AP device to the terminal may include information of the first AP device. The terminal may calculate a throughput of the first AP device based on information of the first AP device.

According to an embodiment of the disclosure, information of the first AP device may include at least one of a transmission power, an operating channel band, the number of spatial streams, information about a central frequency, or WiFi load information of the first AP device.

The terminal may calculate the throughput of the first AP device and determine whether to perform WiFi connection with the first AP device, based on the information of the first AP device received from the first AP device.

The second BLE advertising packet to be transmitted from the second AP device to the terminal, which corresponds to the first BLE advertising packet to be transmitted from the first AP device to the terminal, may include information of the second AP device. The terminal may calculate a throughput of the second AP device based on the information of the second AP device.

In operation 350, the first AP device may perform WiFi connection with the terminal based on a determination by the terminal.

According to an embodiment of the disclosure, when the terminal determines to perform WiFi connection with the first AP device, the first AP device may perform WiFi connection with the terminal. For example, when the terminal determines to perform WiFi connection with the first AP device, the first AP device may transmit and receive information needed for a WiFi handoff to and from the terminal through a WiFi operating channel band of the first AP device. The first AP device may perform WiFi connection with the terminal based on the information needed for the WiFi handoff, received from the terminal.

Figure 4:
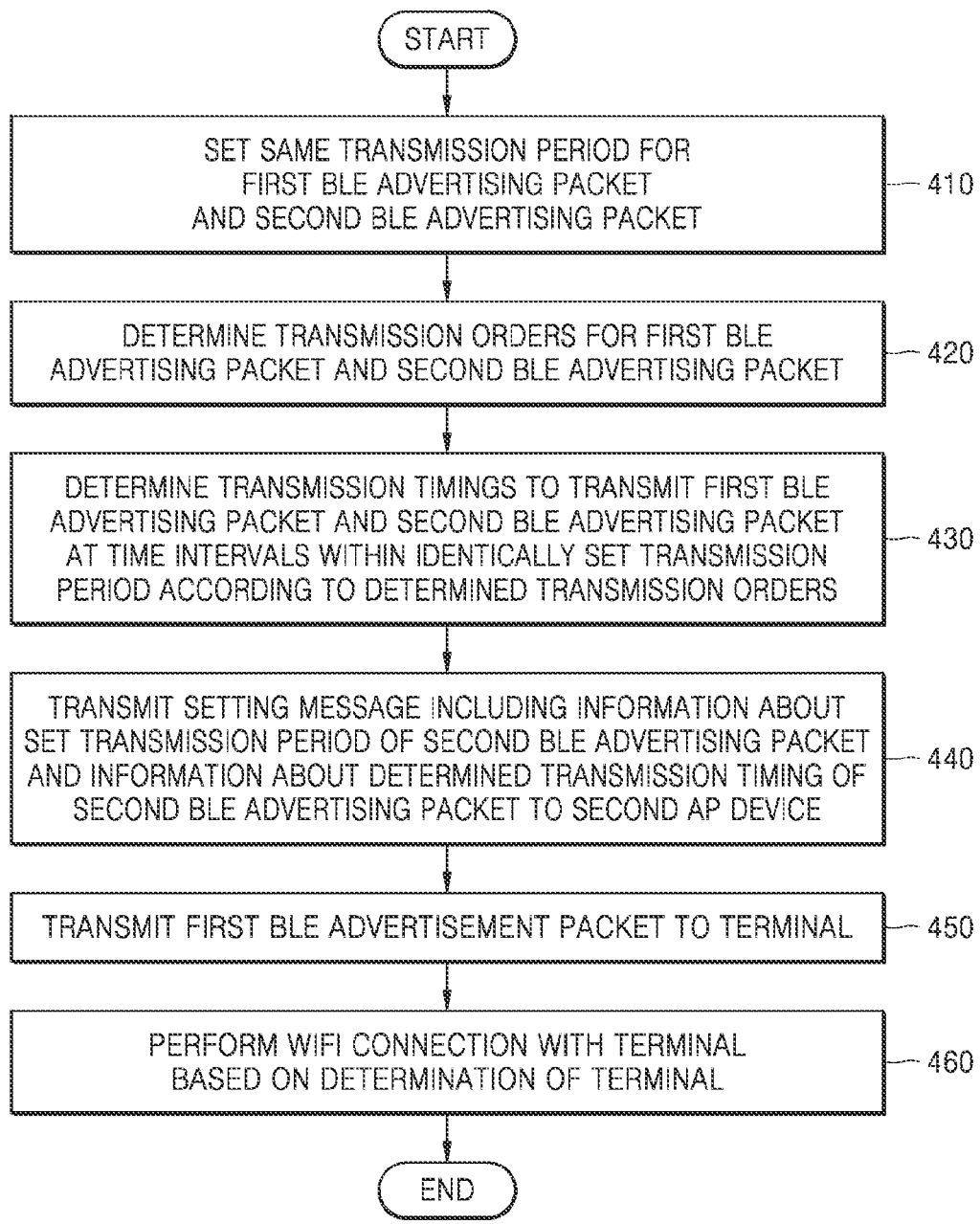
FIG. 4 is a detailed flowchart of an AP coordination method according to an embodiment of the disclosure.

FIG. 4 is a detailed flowchart of an AP coordination method according to an embodiment of the disclosure.

In operation 410, the first AP device may set the transmission period identically for a first BLE advertising packet of the first AP device and a second BLE advertising packet of a second AP device. Operation 410 corresponds to operation 310 of FIG. 3, and thus will not be described in detail.

In operation 420, the first AP device may determine transmission orders for the first BLE advertising packet and the second BLE advertising packet.

According to an embodiment of the disclosure, the first AP device may determine whether which one of the first BLE advertising packet and the second BLE advertising packet is to be transmitted. For example, the first AP device may determine that the first BLE advertising packet is to be transmitted before the second BLE advertising packet.

In operation 430, the first AP device may determine the transmission timings of the first BLE advertising packet and the second BLE advertising packet to transmit the first BLE advertising packet and the second BLE advertising packet at time intervals within the identically set transmission period according to the determined transmission orders.

For example, when the first AP device determines to transmit the first BLE advertising packet before the second BLE advertising packet, the first AP device may first determine an transmission timing of the first BLE advertising packet within the set transmission period. The first AP device may determine an transmission timing of the second BLE advertising packet based on the determined transmission timing of the first BLE advertising packet. More specifically, the first AP device may determine the transmission timing of the second BLE advertising packet to transmit the second BLE advertising packet within a preset time from transmission of the first BLE advertising packet within the identically set transmission period for the BLE advertising packets.

In operation 440, the first AP device may transmit a setting message including information about the set transmission period of the second BLE advertising packet and information about the determined transmission timing of the second BLE advertising packet to the second AP device.

In operation 450, the first AP device may transmit the first BLE advertising packet to the terminal.

In operation 460, the first AP device may perform WiFi connection with the terminal based on a determination by the terminal. Operations 440 through 460 correspond to operations 330 through 350 of FIG. 3, and thus will not be described in detail.

Figure 5:
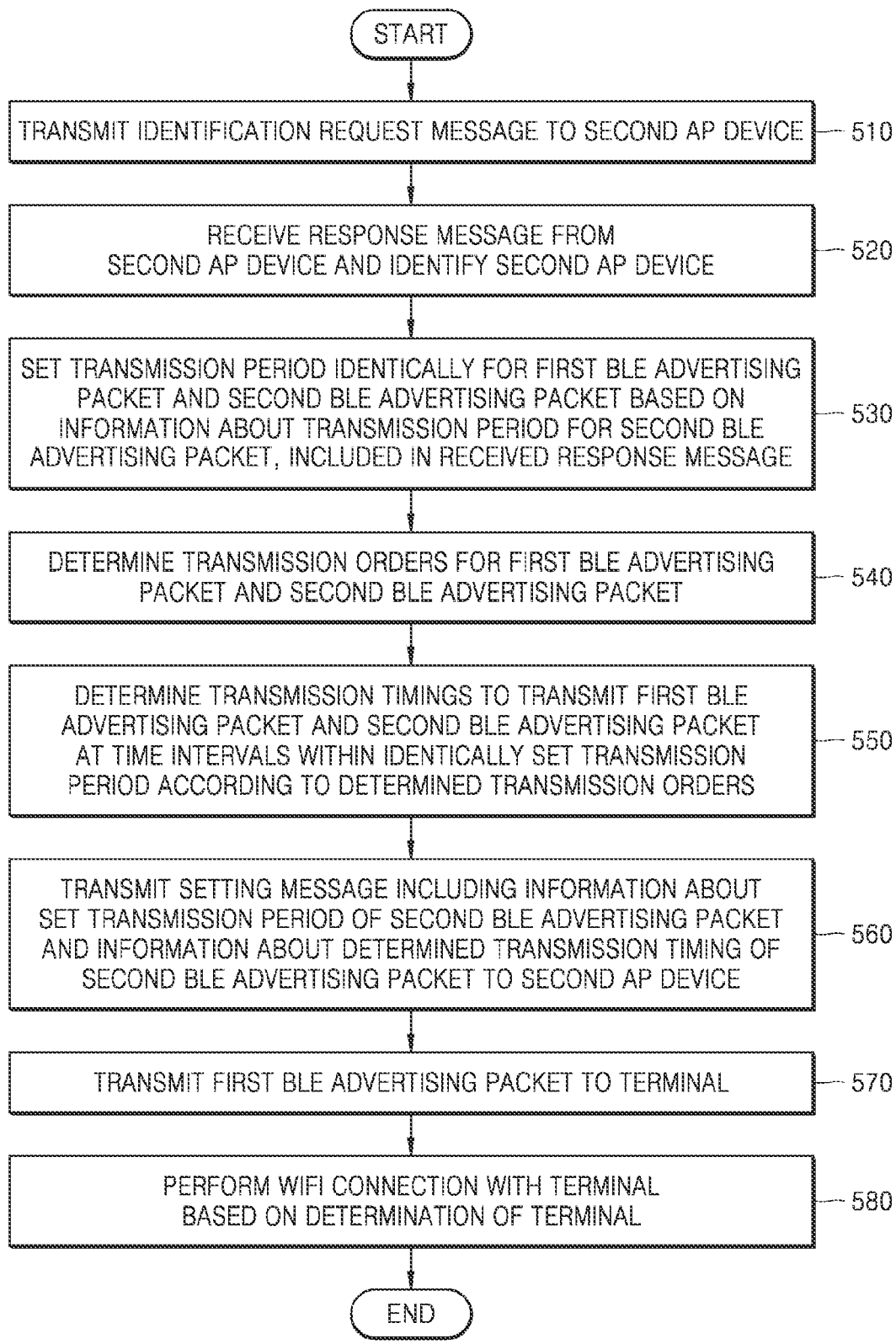
FIG. 5 is a detailed flowchart of an AP coordination method according to an embodiment of the disclosure.

FIG. 5 is a detailed flowchart of an AP coordination method according to an embodiment of the disclosure.

In operation 510, the first AP device may transmit an identification request message to the second AP device.

According to an embodiment of the disclosure, the first AP device may transmit an identification request message for identifying the second AP device to the second AP device. The identification request message may be transmitted through a BLE advertising packet or a WiFi beacon.

In operation 520, the first AP device may receive a response message from the second AP device and identify the second AP device.

According to an embodiment of the disclosure, the first AP device may receive the response message in response to the identification request message transmitted to the second AP device. The response message received from the second AP device may be included in the BLE advertising packet or the WiFi beacon transmitted from the second AP device.

According to an embodiment of the disclosure, the first AP device may identify the second AP device based on the response message received from the second AP device. The response message received from the second AP device may include information about transmission of a BLE advertising packet of the second AP device.

For example, information about the transmission period of the second BLE advertising packet, which is set in the second AP device, may be included in the response message. Thus, by receiving the response message, the first AP device may identify the second AP device and at the same time, obtain information configured in relation to transmission of the second BLE advertising packet for the second AP device.

According to an embodiment of the disclosure, the first AP device may set at least one identified AP device including the identified second AP device into one AP group. The AP device may identify AP devices other than the identified second AP device and set the other identified AP devices together with the identified second AP device into one AP group. For example, when the first AP device identifies five AP devices, the identified five AP devices may be set into one AP group.

According to an embodiment of the disclosure, the first AP device may coordinate BLE advertising packet transmission of the set one AP group. More specifically, the first AP device may set a BLE advertising packet transmission period of each of the AP devices included in the set one AP group, and determine a BLE advertising packet transmission timing of each AP device included in the set one AP group.

For example, when the second AP device that transmits the second BLE advertising packet and a third AP device that transmits a third BLE advertising packet are included in the set one AP group, the first AP device may set the transmission period identically for the first BLE advertising packet, the second BLE advertising packet, and the third BLE advertising packet and determine transmission timings for them.

In operation 530, the first AP device may set the transmission period identically for the first BLE advertising packet and the second BLE advertising packet based on information about the transmission period for the second BLE advertising packet, included in the received response message.

According to an embodiment of the disclosure, the first AP device may obtain the information about a transmission period of the second BLE advertising packet of the second AP device from the response message received from the second AP device. The information about the transmission period of the second BLE advertising packet of the second AP device may include information about the amount of power consumed depending on the currently set transmission period of the second BLE advertising packet and the transmission period of the second BLE advertising packet in the second AP device.

According to an embodiment of the disclosure, the first AP device may set the transmission period identically for the first BLE advertising packet and the second BLE advertising packet based on the information about the transmission period of the second BLE advertising packet. When the transmission period of the first BLE advertising packet and the transmission period of the second BLE advertising packet have already been set the same as each other, the first AP device may not need to set the transmission periods differently.

According to some embodiments of the disclosure, when the transmission period of the first BLE advertising packet and the transmission period of the second BLE advertising packet are set differently, the first AP device may set the same transmission period for the first BLE advertising packet and the second BLE advertising packet as an transmission period considering both the amount of power consumption based on the transmission period of the first BLE advertisement packet and the amount of power consumption based on the transmission period of the second BLE advertisement packet.

Needless to say, the first AP device may not need to set the transmission period identically for the first BLE advertising packet and the second BLE advertising packet. According to an embodiment of the disclosure, the first AP device may set the transmission period of the first BLE advertising packet and the transmission period of the second BLE advertising packet, such that one period is a multiple of the other. The first AP device may set the transmission period of the first BLE advertising packet and the transmission period of the second BLE advertising packet such that they have a difference within a range. That is, the first AP device may determine an transmission period of a BLE advertising packet based on various information such as a WiFi channel state, a network state, the number of AP devices in a group, etc.

In operation 540, the first AP device may determine transmission orders for the first BLE advertising packet and the second BLE advertising packet. Operation 540 may correspond to operation 420 of FIG. 4.

In operation 550, the first AP device may determine the transmission timings of the first BLE advertising packet and the second BLE advertising packet to transmit the first BLE advertising packet and the second BLE advertising packet at time intervals within the identically set transmission period according to the determined transmission orders. Operation 550 may correspond to operation 430 of FIG. 4.

In operation 560, the first AP device may transmit a setting message including information about the set transmission period of the second BLE advertising packet and information about the determined transmission timing of the second BLE advertising packet to the second AP device. Operation 560 may correspond to operation 440 of FIG. 4.

In operation 570, the first AP device may transmit the first BLE advertising packet to the terminal. Operation 570 may correspond to operation 450 of FIG. 4.

In operation 580, the first AP device may perform WiFi connection with the terminal based on a determination by the terminal. Operation 580 may correspond to operation 460 of FIG. 4.

Figure 6:
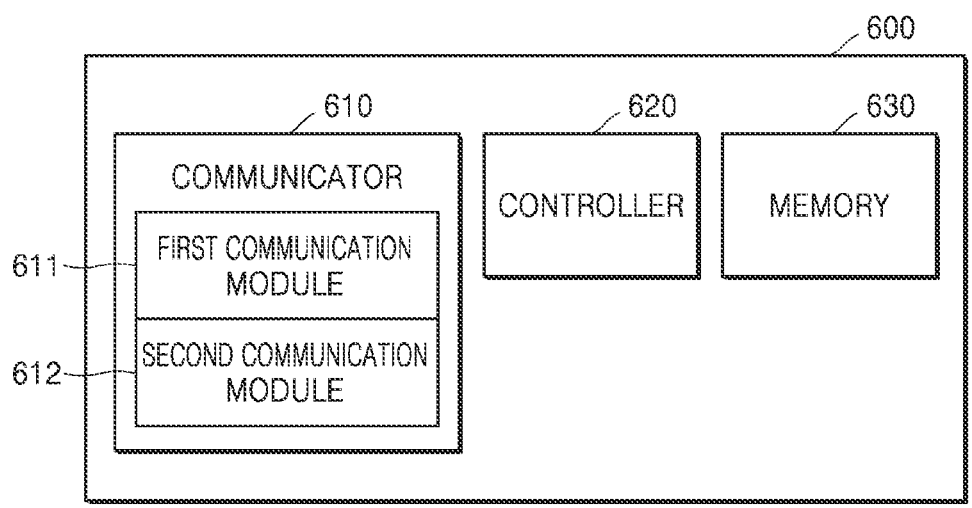
FIG. 6 is a block diagram of a first AP device according to an embodiment of the disclosure.

FIG. 6 is a block diagram of a first AP device according to an embodiment of the disclosure.

A first AP device 600 shown in FIG. 6 may perform the methods shown in FIGS. 3 through 5. Thus, even when omitted in the following description, the foregoing description made in relation to the methods shown in FIGS. 3 through 5 may also be performed by the first AP device 600 shown in FIG. 6.

As shown in FIG. 6, the first AP device 600 according to an embodiment of the disclosure may include a communicator 610, a memory 620, and a controller 630. However, all of the elements shown in FIG. 6 are not essential elements of the first AP device 600. More elements or less elements than those shown in FIG. 6 may be used to implement the first AP device 600.

According to an embodiment of the disclosure, the communicator 610 may include a first communication module 611 and a second communication module 612.

The first communication module 611 according to an embodiment of the disclosure may perform BLE communication. For example, the first communication module 611 may transmit the first BLE advertising packet to the terminal. The first communication module 611 may transmit a BLE advertising packet including an identification request message to the second AP device and receive a BLE advertising packet including a response message with respect to the transmitted identification request message from the second AP device.

The first communication module 611 may transmit a BLE advertising packet that includes a setting message including information about the set transmission period of the second BLE advertising packet and information about the determined transmission timing of the second BLE advertising packet to the second AP device.

According to an embodiment of the disclosure, the second communication module 612 may perform WiFi communication. For example, the second communication module 612 may perform WiFi connection with the terminal. The second communication module 612 may transmit a WiFi beacon including an identification request message to the second AP device and receive a WiFi beacon including a response message with respect to the transmitted identification request message from the second AP device.

The second communication module 612 may transmit a WiFi beacon that includes a setting message including information about the set transmission period of the second BLE advertising packet and information about the determined transmission timing of the second BLE advertising packet to the second AP device. The communicator 610 may further include other communication modules in addition to the first communication module 611 and the second communication module 612.

The memory 620 according to an embodiment of the disclosure may store information received from the terminal or the second AP device. Programs and data required for an operation of the first AP device may be stored. The memory 620 may include a storage medium such as read only memory (ROM), random access memory (RAM), hard-disk, compact disc (CD)-ROM, digital versatile disc (DVD), etc., or a combination thereof. The memory 620 may also include a plurality of memories.

According to an embodiment of the disclosure, the controller 630 may include at least one processor. The controller 630 may control all elements of the first AP device and may perform an AP coordination method by executing a program stored in the memory 620.

The controller 630 may set the transmission period of the first BLE advertising packet and the transmission period of the second BLE advertising packet of the second AP device. For example, the controller 630 may set the transmission period for the first BLE advertising packet and the second BLE advertising packet identically.

The controller 630 according to an embodiment of the disclosure may determine the transmission orders of the first BLE advertising packet and the second BLE advertising packet and determine the transmission timings to transmit the first BLE advertising packet and the second BLE advertising packet at time intervals within the set transmission period according to the determined transmission orders.

The controller 630 according to an embodiment of the disclosure may identify the second AP device based on the response message received from the second AP device.

The controller 630 according to an embodiment of the disclosure may set at least one identified AP device including the identified second AP device into one AP group. Herein, the set one AP group may be coordinated by the first AP device.

The first AP device according to an embodiment of the disclosure may set the transmission period identically for the first BLE advertising packet and the second BLE advertising packet based on information about the transmission period for the second BLE advertising packet, included in the response message received from the second AP device.

Figure 7:
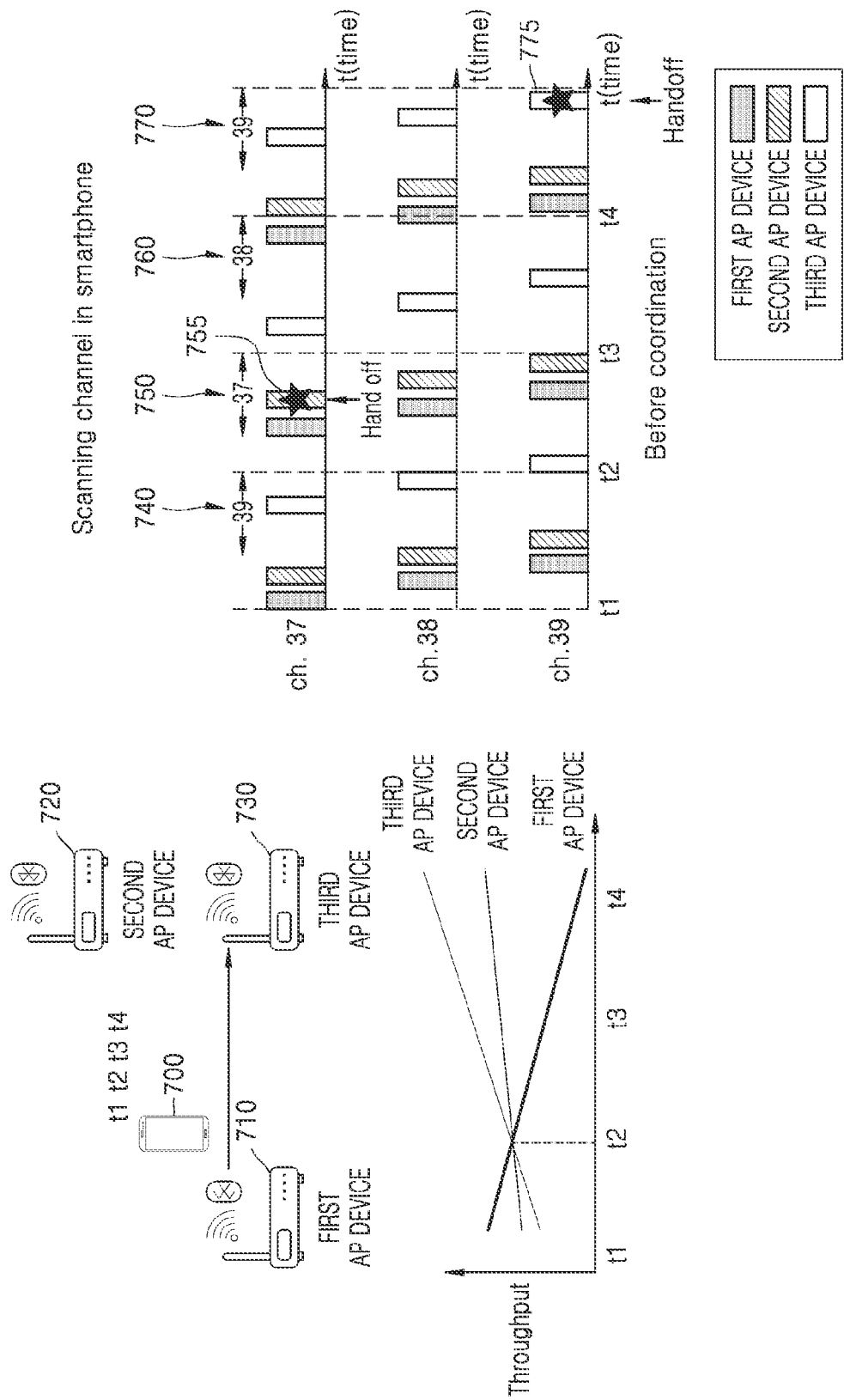
FIGS. 7 and 8 are views for describing a handoff process of a terminal in a system in which AP coordination is performed, according to an embodiment of the disclosure.
Figure 8:
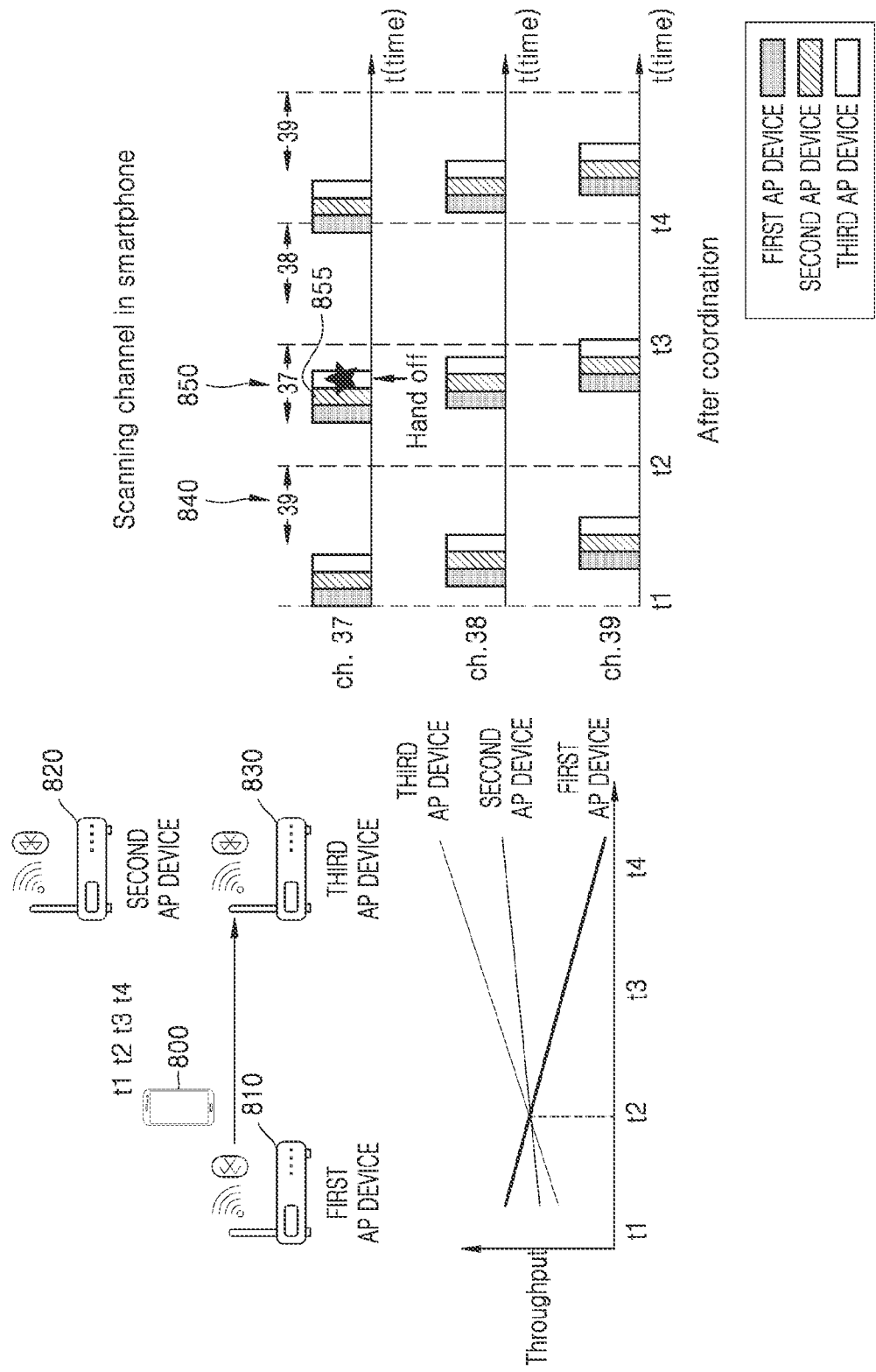

FIGS. 7 and 8 are views for describing a handoff process of a terminal in a system in which AP coordination is performed, according to an embodiment of the disclosure.

Referring to FIG. 7, FIG. 7 shows a handoff process of a mobile terminal in a system in which AP coordination is not performed. Each of first through third AP devices 710 through 730 of FIG. 7 may be an AP device capable of performing WiFi connection with a terminal 700. The terminal 700 may calculate a throughput of each of the AP devices 710 through 730 based on information of each of the AP devices 710 through 730. Information of each of the AP devices 710 through 730 may be included in the first BLE advertising packet, the second BLE advertising packet, and the third BLE advertising packet that are transmitted by the AP devices 710 through 730 to the terminal 700 through BLE advertising packet advertisement channels 37 through 39, respectively.

Hereinbelow, referring to FIG. 7, a description will be made assuming that as time goes by from time t1 when the terminal 700 performs WiFi connection with the first AP device 710 (t1☐t4), the terminal 700 approaches the second AP device 720 and the third AP device 730.

Referring to a graph showing a throughput of each AP device with respect to time, it may be seen that throughputs of the AP devices 710, 720, and 730 near the terminal 700 change as the terminal 700 moves.

Referring to FIG. 7, at time t1, the throughput of the first AP device 710 is greater than the throughputs of the second AP device 720 and the third AP device 730. However, as time goes by, the terminal 700 approaches the second AP device 720 and the third AP device 730, and after time t2, the throughputs of the second AP device 720 and the third AP device 730 are greater than the throughput of the first AP device 710.

Thus, to perform smooth WiFi communication, the terminal 700 needs to perform a handoff with the second AP device 720 or the third AP device 730 after the time t2. Moreover, the throughput of the third AP device 730 is greater than that of the second AP device 720 after the time t2, such that the terminal 700 needs to perform a handoff with the third AP device 730.

Referring to the graph regarding each of the BLE advertising packet advertisement channels 37 through 39 over time, it may be seen that each of the AP devices 710 through 730 transmits a BLE advertising packet to the terminal 700 through each of the BLE advertising packet advertisement channels 37 through 39 and the terminal 700 performs a scanning operation with respect to the BLE advertising packet transmitted through each channel. The terminal 700 may periodically perform a scanning operation with respect to each BLE advertising packet advertisement channel.

Referring to FIG. 7, the terminal 700 may scan the BLE advertising packet transmitted through the channel 39 as indicated by 740. The terminal 700 may scan the second BLE advertising packet of the second AP device 720, which is transmitted through the channel 39. In this way, the terminal 700 may calculate the throughput of the second AP device 720. However, a moment when the terminal 700 receives the second BLE advertising packet through scanning precedes the time t2 and before the time t2, the throughput of the first AP device 710 connected to the terminal 700 is greater than the throughput of the second AP device 720, such that the terminal 700 may not perform a handoff with the second AP device 720 based on a calculation result with respect to the throughput of the second AP device 720.

The terminal 700 may scan the BLE advertising packet transmitted the channel 37 as indicated by 750. The terminal 700 may scan the first BLE advertising packet of the first AP device 710 and the second BLE advertising packet of the second AP device 720. In this way, the terminal 700 may calculate the throughput of the second AP device 720. In this case, a moment when the terminal 700 receives the second BLE advertising packet follows the time t2, after which the throughput of the second AP device 720 is greater than the throughput of the first AP device 710 connected to the terminal 700, such that the terminal 700 performs a handoff with the second AP device 720 as indicated by 755.

The terminal 700 may scan the BLE advertising packet transmitted the channel 38 as indicated by 760. The BLE advertising packet is not transmitted from each of the APs 710 through 730 at a moment when scanning is performed for the channel 38, and thus the terminal 700 may not obtain information about the APs 710 to 730 through scanning for the channel 38.

Thereafter, the terminal 700 may scan the BLE advertising packet transmitted through the channel 39 as indicated by 770. In this case, the terminal 700 may scan the third BLE advertising packet of the third AP device 730. In this way, the terminal 700 may calculate the throughput of the third AP device 730. A moment when the terminal 700 receives the third BLE advertising packet follows the time t2, after which the throughput of the third AP device 730 is greater than the throughput of the second AP device 720 connected to the terminal 700, such that the terminal 700 performs a handoff with the third AP device 730 as indicated by 775.

Referring to the handoff process of the terminal 700 in FIG. 7, the terminal 700 may finally perform a handoff with the third AP device 730 having the greatest throughput after the time t2. However, each of the AP devices 710 through 730 performs a BLE advertising packet to the terminal 700 when AP coordination is not performed with respect to the AP devices 710 through 730, such that a timing for the terminal 700 to receive the BLE advertising packet from each of the AP devices 710 through 730 is different and does not fall within a range, and thus comparison between throughputs of the AP devices 710 through 730 may be difficult to perform. Thus, even in a situation where a handoff of the terminal 700 in FIG. 7 to the third AP device 730 is favorable after the time t2, reception of the third BLE advertising packet by the third AP device 730 is delayed and thus the terminal 700 performs an unnecessary handoff with the second AP device 720 as indicated by 755 and a handoff with the third AP device 730 is delayed as indicated by 775.

FIG. 8 shows a handoff process of a mobile terminal in a system in which AP coordination is performed, according to an embodiment of the disclosure.

The system in FIG. 8 is a system in which AP coordination is performed with respect to AP devices 810 through 830 under the same condition as that for the system in FIG. 7.

Referring to FIG. 8, a terminal 800 may scan the BLE advertising packet transmitted through the channel 39 as indicated by 840. The BLE advertising packet is not transmitted from each of the APs 710 through 730 at a moment when the terminal 800 performs scanning for the channel 39, and thus the terminal 800 may not obtain information about the AP devices 810 to 830 through scanning for the channel 39.

The terminal 800 may scan the BLE advertising packet transmitted through the channel 37 as indicated by 850. The terminal 800 may scan BLE advertising packets of the AP devices 810 through 830, which are transmitted through the channel 37. In this way, the terminal 800 may calculate the throughput of each of the AP devices 810 through 830. Moments when the terminal 800 receives the BLE advertising packets of the AP devices 810 through 830 follow the time t2, after which the throughput of the third AP device 830 is greater than the throughput of the second AP device 820 connected to the terminal 800, such that the terminal 800 performs a handoff with the third AP device 830 from the first AP device 810 as indicated by 855.

In FIG. 8, the terminal 800 performs a handoff with the third AP device 830 earlier than in FIG. 7. In FIG. 8, AP coordination may be performed with respect to the AP devices 810 through 830 to coordinate an transmission timing of a BLE advertising packet transmitted by each of the AP devices 810 through 830, such that the terminal 800 may be caused to receive the first BLE advertising packet, the second BLE advertising packet, and the third BLE advertising packet including information of each of the AP devices 810 through 830 for throughput calculation within a time. The terminal 800 may receive the first BLE advertising packet, the second BLE advertising packet, and the third BLE advertising packet within a time in a range, and compare throughputs of the AP devices 810 through 830 based on the received BLE advertising packets. Thus, the terminal 800 may perform a handoff with the AP device 830 having the greatest throughput without performing an unnecessary handoff at an earlier moment.

Figure 9:
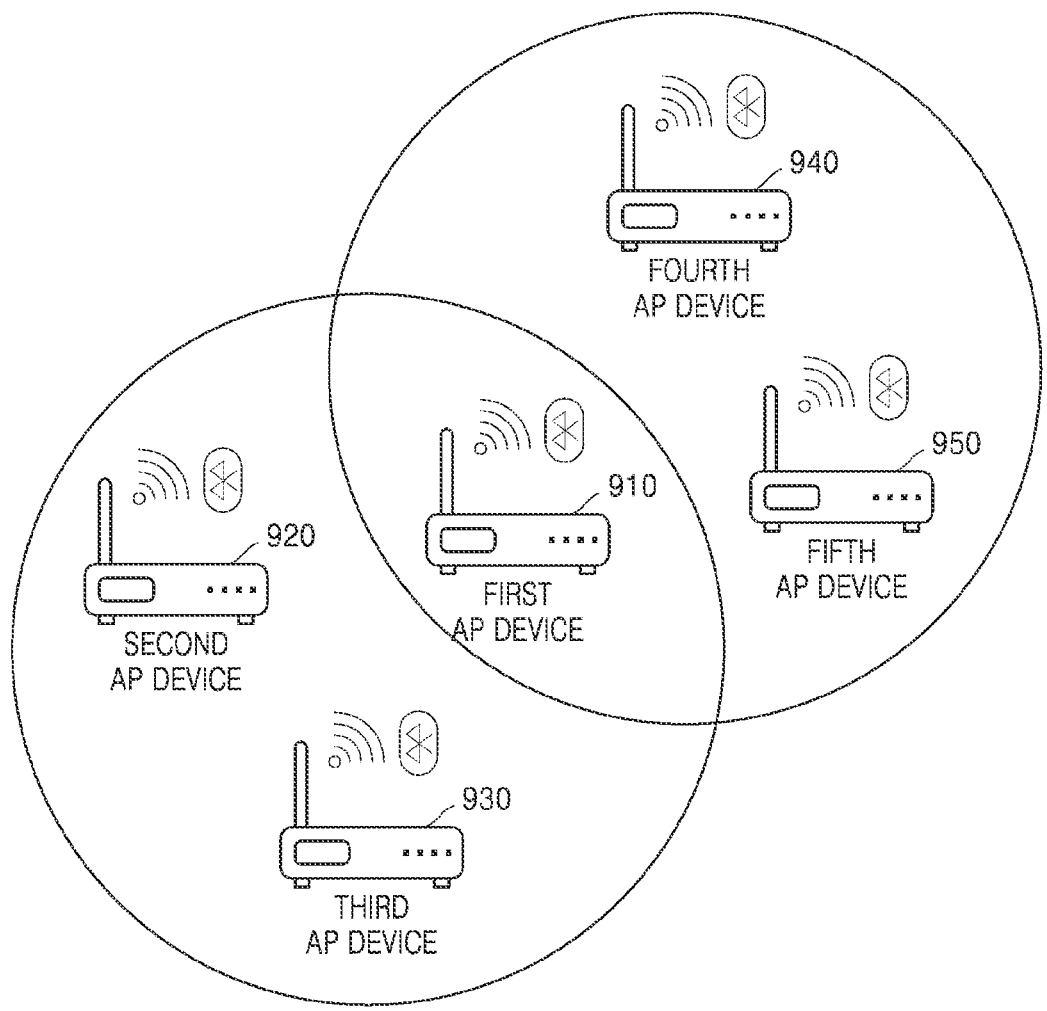
FIG. 9 is a diagram illustrating a group of AP devices according to an embodiment of the disclosure.

FIG. 9 is a diagram illustrating a group of AP devices according to an embodiment of the disclosure.

According to an embodiment of the disclosure, a first AP device 910 may transmit an identification request message to nearby AP devices 920 through 950 and receive a response message from each of the nearby AP devices 920 through 950 to identify the nearby AP devices 920 through 950. According to an embodiment of the disclosure, the first AP device 910 may set the identified nearby AP devices 920 through 950 into one AP group. Herein, the set one AP group may include the first AP device.

According to an embodiment of the disclosure, the first AP device 910 may coordinate BLE advertising packet transmission of the set one AP group. More specifically, the first AP device 910 may set a BLE advertising packet transmission period of each of the AP devices 910 through 950 included in the set one AP group, and determine a BLE advertising packet transmission timing of each AP device included in the set one AP group.

According to an embodiment of the disclosure, each of the AP devices 920 through 950 other than the first AP device 910 may transmit an identification request message to nearby AP devices and receive a response message in response to the identification request message to identify the nearby AP devices. The AP devices 920 through 950 other than the first AP device 910 may set AP devices including the identified nearby AP devices into one AP group. That is, there may be a plurality of AP groups.

According to an embodiment of the disclosure, when at least one AP device is included in a plurality of AP groups, a device that identifies the most AP devices may be determined as an AP coordinator. Referring to FIG. 9, AP devices other than the first AP device 910 may identify only AP devices in a limited range when compared to the first AP device 910 and set the identified AP devices into an AP device group. For example, the second AP device 920 may not identify the fourth AP device 940 and the fifth AP device 950 according to a limitation of a communicable range, and may identify only the first AP device 910 and the third AP device 930 and set them into one AP group.

Thus, when the second AP device 920 other than the first AP device 910 performs AP coordination among AP devices by serving as a coordinator, an AP coordination range may be limited in comparison to when AP coordination is performed by the first AP device 910. More specifically, AP coordination performed by the second AP device 920 may be limited for the fourth AP device 940 and the fifth AP device 950 that may not be directly identified.

Hence, to maximize an effect through AP coordination, an AP device capable of identifying and grouping the largest number of AP devices may perform AP coordination by serving as a coordinator. Each AP device may exchange with the other AP devices, information about another AP device identified by the AP device, and among the AP devices, an AP device having identified the most AP devices may perform AP coordination as an AP coordinator. Needless to say, the disclosure is not limited to the example.

Figure 10:
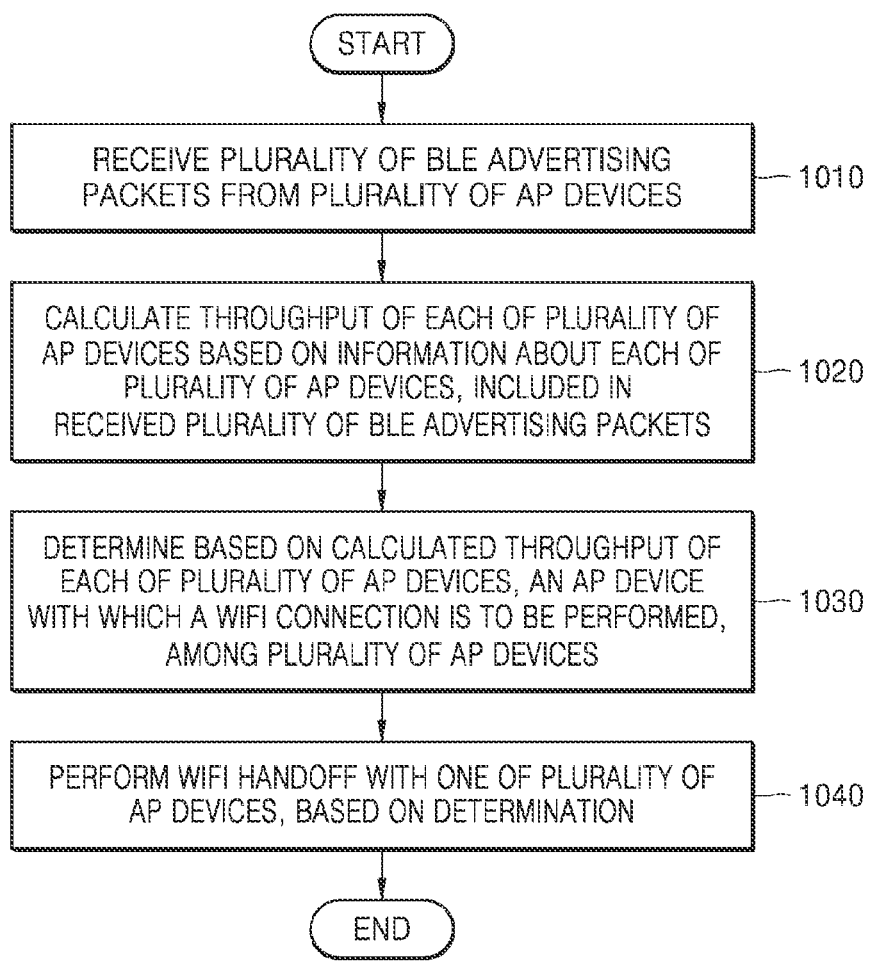
FIG. 10 is a flowchart of a method, performed by a terminal, of performing a handoff according to an embodiment of the disclosure.

FIG. 10 is a flowchart of a method, performed by a terminal, of performing a handoff according to an embodiment of the disclosure.

In operation 1010, a terminal may receive a plurality of BLE advertising packets from a plurality of AP devices.

According to an embodiment of the disclosure, the terminal may correspond to the terminal described in relation to FIGS. 3 through 5, and the plurality of AP devices may correspond to the first AP device or the second AP device described in relation to FIGS. 3 through 5.

In operation 1020, the terminal may calculate a throughput of each of the plurality of AP devices based on information about each of the plurality of AP devices, in which the information is included in each of the received plurality of BLE advertising packets.

According to an embodiment of the disclosure, the terminal may calculate a throughput of each of the plurality of AP devices based on information about each of the plurality of AP devices. For example, information about each of the plurality of AP devices may include at least one of a transmission power, an operating channel band, the number of spatial streams, information about a central frequency, or WiFi load information for each of the plurality of AP devices.

In operation 1030, the terminal may determine based on the calculated throughput of each of the plurality of AP devices, an AP device with which a WiFi connection is to be performed, among the plurality of AP devices.

According to an embodiment of the disclosure, the terminal may compare a throughput of a currently WiFi-connected AP device with the calculated throughput of each of the plurality of AP devices ad determine to perform a WiFi handoff when among the plurality of AP devices, there is an AP device having a throughput greater than that of the currently WiFi-connected AP device. When there are several AP devices having throughputs greater than that of the currently WiFi-connected AP device among the plurality of AP devices, the terminal may determine to perform WiFi connection with an AP device having the greatest throughput among the several AP devices.

In operation 1040, the terminal may perform a WiFi handoff with one of the plurality of AP devices, based on the determination.

According to an embodiment of the disclosure, the terminal may perform a WiFi handoff by transmitting and receiving information required for a WiFi handoff through a WiFi operating channel band of the AP device determined to perform the WiFi handoff with.

The terminal may perform determine whether to perform a WiFi handoff by using a BLE advertising packet received from the plurality of AP devices without separate WiFi scanning and perform the WiFi handoff. Thus, the terminal may perform the WiFi handoff without power consumption and handoff delay that may be caused by WiFi scanning.

Figure 11:
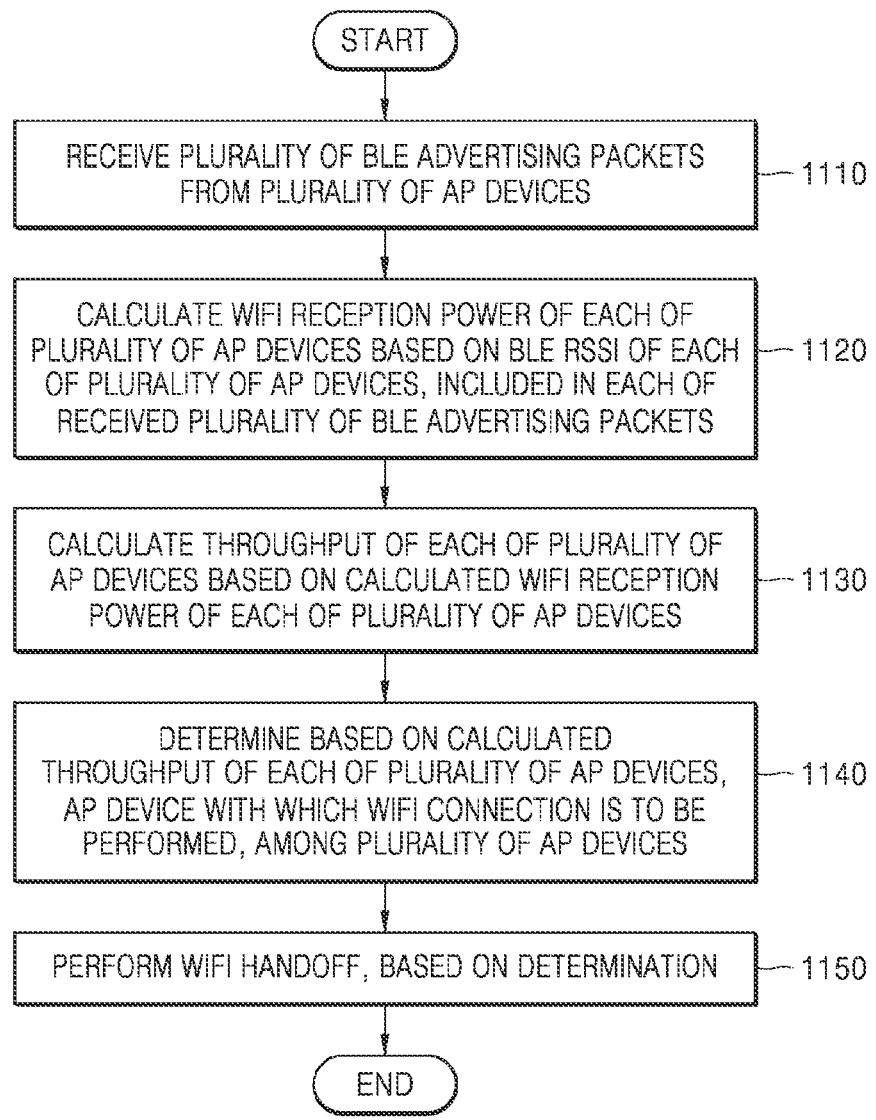
FIG. 11 is a detailed flowchart of a method, performed by a terminal, of performing a handoff according to an embodiment of the disclosure.

FIG. 11 is a detailed flowchart of a method, performed by a terminal, of performing a handoff according to an embodiment of the disclosure.

In operation 1110, a terminal may receive a plurality of BLE advertising packets from a plurality of AP devices. Operation 1110 may correspond to operation 1010 of FIG. 10.

In operation 1120, the terminal may calculate a WiFi reception power of each of the plurality of AP devices based on a BLE received signal strength indicator (RSSI) of each of the plurality of AP devices, the BLE RSSI being included in each of the received plurality of BLE advertising packets.

According to an embodiment of the disclosure, the terminal may calculate the BLE reception power based on the BLE RSSI of each of the plurality of AP devices, in which the BLE RSSI is included in each of the plurality of BLE advertising packets. The terminal may calculate a distance between the terminal and each of the plurality of AP devices based on the calculated BLE reception power and a path loss model. The terminal may calculate a WiFi reception power of each of the plurality of AP devices based on the calculated distance between the terminal and each of the plurality of AP devices.

In operation 1130, the terminal may calculate a throughput of each of the plurality of AP devices based on the calculated WiFi reception power of each of the plurality of AP devices.

According to an embodiment of the disclosure, the terminal may calculate a WiFi RSSI based on the calculated WiFi reception power of each of the plurality of AP devices and calculate the throughput of each of the plurality of AP devices based on the calculated WiFi RSSI.

In operation 1140, the terminal may determine based on the calculated throughput of each of the plurality of AP devices, an AP device with which a WiFi connection is to be performed, among the plurality of AP devices. Operation 1140 may correspond to operation 1030 of FIG. 10.

In operation 1150, the terminal may perform a WiFi handoff, based on the determination. Operation 1150 may correspond to operation 1040 of FIG. 10.

Figure 12:
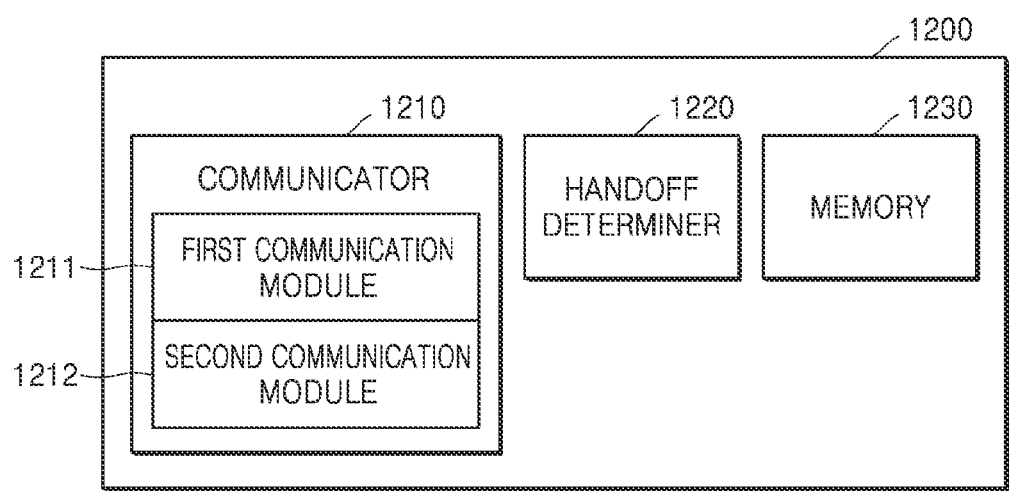
FIG. 12 is a block diagram of a terminal according to an embodiment of the disclosure.

FIG. 12 is a block diagram of a terminal according to an embodiment of the disclosure.

A terminal 1200 shown in FIG. 12 may perform the methods shown in FIGS. 10 and 11. Thus, even when omitted in the following description, the foregoing description made in relation to the methods shown in FIGS. 10 and 11 may also be performed by the terminal 1200 shown in FIG. 12.

As shown in FIG. 12, the terminal 1200 according to an embodiment of the disclosure may include a communicator 1210, a handoff determiner 1220, and a memory 1230. However, all of the elements shown in FIG. 12 are not essential elements of the terminal 1200.

According to an embodiment of the disclosure, the communicator 1210 may include a first communication module 1211 and a second communication module 1212.

The first communication module 1211 according to an embodiment of the disclosure may perform BLE communication. For example, the first communication module 1211 may receive the plurality of BLE advertising packets from the plurality of AP devices.

The second communication module 1212 according to an embodiment of the disclosure may perform WiFi communication. For example, the second communication module 1212 may perform WiFi connection with an AP device. The communicator 1210 may further include other communication modules in addition to the first communication module 1211 and the second communication module 1212.

The handoff determiner 1220 according to an embodiment of the disclosure may calculate a throughput of each of the plurality of AP devices, based on information about each of the plurality of AP devices, the information being included in each of the plurality of BLE advertising packets received from the plurality of AP devices, and determine an AP device with which a WiFi connection is to be performed, among the plurality of AP devices, based on the calculated throughput of each of the plurality of AP devices.

The handoff determiner 1220 according to an embodiment of the disclosure may calculate the WiFi reception power of each of the plurality of AP devices based on the BLE RSSI of each of the plurality of AP devices, in which the BLE RSSI is included in each of the received plurality of BLE advertising packets, and calculate the throughput of each of the plurality of AP devices based on the WiFi reception power of each of the plurality of AP devices.

Information received each AP device and a throughput calculation result of each AP device may be stored in the memory 1230 according to an embodiment of the disclosure. Programs and data required for an operation of the terminal 1200 may also be stored in the memory 1230. The memory 1230 may include a storage medium such as read only memory (ROM), random access memory (RAM), hard-disk, compact disc (CD)-ROM, digital versatile disc (DVD), etc., or a combination thereof. The memory 1230 may also include a plurality of memories.

FIG. 13 is a signal flow of an AP system according to an embodiment of the disclosure.

In operation 1310, a first AP device 1301 may transmit a first identification request message to a second AP device 1302.

In operation 1315, the first AP device 1301 may receive a first response message in response to the first identification request message from a second AP device 1302.

In operation 1320, the first AP device 1301 may transmit a second identification request message to a third AP device 1303.

In operation 1325, the third AP device 1303 may receive a second response message in response to the second identification request message from the third AP device 1303.

In operation 1330, the first AP device 1301 may set a BLE advertising packet transmission period of each of the first AP device 1301, the second AP device 1302, and the third AP device 1303, and determine a BLE advertising packet transmission timing of each of the first AP device 1301, the second AP device 1302, and the third AP device 1303.

In operation 1340, the first AP device 1301 may transmit a setting message including information about the set BLE advertising packet transmission period of each of the first AP device 1301, the second AP device 1302, and the third AP device 1303 and the determined BLE advertising packet transmission timing of each of the first AP device 1301, the second AP device 1302, and the third AP device 1303 to the second AP device 1302 and the third AP device 1303.

In operation 1350, the first AP device 1301 may transmit a first BLE advertising packet to the terminal 1300 based on the set BLE advertising packet transmission period and the determined BLE advertising packet transmission timing.

In operation 1360, the second AP device 1302 may transmit a second BLE advertising packet to the terminal 1300 according to the set BLE advertising packet transmission period and the determined BLE advertising packet transmission timing based on the received setting message.

In operation 1370, the third AP device 1303 may transmit a third BLE advertising packet to the terminal 1300 according to the set BLE advertising packet transmission period and the determined BLE advertising packet transmission timing based on the received setting message.

In operation 1380, the terminal 1300 may calculate a throughput of each AP device (the first AP device 1301 through the third AP device 1303) based on the received plurality of BLE advertising packets (the first BLE advertising packet through the third BLE advertising packet) and determine an AP device with which a handoff is to be performed, based on a result of the calculation.

FIG. 14 is a signal flow of an AP system according to an embodiment of the disclosure.

In operation 1410, an AP controller 1404 may receive first data from a first AP device 1401.

In operation 1420, the AP controller 1404 may receive second data from a second AP device 1402.

In operation 1430, the AP controller 1404 may receive third data from a third AP device 1403.

In operation 1440, the AP controller 1404 may set a BLE advertising packet transmission period of each of the first AP device 1401, the second AP device 1402, and the third AP device 1403, and determine a BLE advertising packet transmission timing of each of the first AP device 1401, the second AP device 1402, and the third AP device 1403.

In operation 1450, the AP controller 1404 may transmit a setting message including information about the set BLE advertising packet transmission period of each of the first AP device 1301, the second AP device 1302, and the third AP device 1303 and the determined BLE advertising packet transmission timing of each of the first AP device 1301, the second AP device 1302, and the third AP device 1303 to the first AP device 1401, the second AP device 1402, and the third AP device 1403.

In operation 1460, the first AP device 1401 may transmit a first BLE advertising packet to a terminal 1400.

In operation 1470, the second AP device 1402 may transmit a second BLE advertising packet to the terminal 1400.

In operation 1480, the third AP device 1403 may transmit a third BLE advertising packet to the terminal 1400.

In operation 1490, the terminal 1400 may calculate a throughput of each AP device (the first AP device 1401 through the third AP device 1403) based on the received plurality of BLE advertising packets (the first BLE advertising packet through the third BLE advertising packet) and determine an AP device with which a handoff is to be performed, based on a result of the calculation.

An apparatus according to the disclosure may a processor, a memory for storing program data and executing it, a permanent storage such as a disk drive, a communications port for communicating with external devices, and user interface devices, such as a touch panel, a key, a button, etc. Methods implemented with a software module or algorithm may be stored as computer-readable codes or program commands executable on the processor on computer-readable recording media. Examples of the computer-readable recording media may include a magnetic storage medium (e.g., read-only memory (ROM), random-access memory (RAM), floppy disk, hard disk, etc.) and an optical medium (e.g., a compact disc-ROM (CD-ROM), a digital versatile disc (DVD), etc.), and so forth. The computer-readable recording medium may also be distributed over network coupled computer systems so that a computer-readable code is stored and executed in a distributed fashion. The medium may be read by a computer, stored in a memory, and executed by a processor.

All documents cited in the above description, including published documents, patent applications, and patents, may be incorporated herein in their entirety by reference in the same manner as when each cited document is separately and specifically incorporated or incorporated in its entirety.

Reference numerals have been used in exemplary embodiments illustrated in the attached drawings to help understanding of the disclosure, and particular terms have been used to describe the embodiments of the disclosure, but the disclosure is not limited to the particular terms, and the disclosure may include any element that may be generally conceived by those of ordinary skill in the art.

The disclosure may be represented by block components and various process operations. Such functional blocks may be implemented by various numbers of hardware and/or software components which perform specific functions. For example, the disclosure may employ various integrated circuit components, e.g., memory elements, processing elements, logic elements, look-up tables, and the like, which may carry out a variety of functions under the control of one or more microprocessors or other control devices. Similarly, where the elements of the disclosure are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented as an algorithm executed in one or more processors. Furthermore, the disclosure may employ any number of techniques according to the related art for electronics configuration, signal processing and/or control, data processing and the like. The term "mechanism", "element", "means", or "component" is used broadly and is not limited to mechanical or physical embodiments of the disclosure. The term may include a series of routines of software in conjunction with the processor or the like.

The particular implementations shown and described herein are illustrative examples of the disclosure and are not intended to otherwise limit the scope of the disclosure in any way. For the sake of brevity, electronics according to the related art, control systems, software development and other functional aspects of the systems may not be described in detail. Furthermore, the connecting lines, or connectors shown in the various figures presented are intended to represent exemplary functional relationships and/or physical or logical couplings between the various elements. Moreover, no item or component is essential to the practice of the disclosure unless the element is specifically described as "essential" or "critical".

In the disclosure (especially, in the claims), the use of "the" and other demonstratives similar thereto may correspond to both a singular form and a plural form. Also, when a range is described in the disclosure, the range has to be regarded as including inventions adopting any individual element within the range (unless described otherwise), and it has to be regarded as having written in the detailed description of the disclosure each individual element included in the range. Unless the order of operations of a method according to the disclosure is explicitly mentioned or described otherwise, the operations may be performed in a proper order. The order of the operations is not limited to the order the operations are mentioned. The use of all examples or exemplary terms (e.g., "etc.,", "and (or) the like", and "and so forth") is merely intended to describe the disclosure in detail, and the scope is not necessarily limited by the examples or exemplary terms unless defined by the claims. Also, one of ordinary skill in the art may appreciate that the disclosure may be configured through various modifications, combinations, and changes according to design conditions and factors without departing from the spirit and technical scope of the disclosure and its equivalents.

The invention claimed is:

1. A first access point (AP) device comprising:
   a memory;
   a communicator comprising a first communication module configured to transmit a first Bluetooth Low Energy (BLE) advertising packet and a second communication module configured to perform a Wireless Fidelity (Wi-Fi) connection; and
   at least one processor configured to:
     set a transmission period identically for the first BLE advertising packet and a second BLE advertising packet of a second AP device,
     determine a transmission timing so that the first BLE advertising packet and the second BLE advertising packet are transmitted to a terminal at a predetermined time interval,
     transmit, to the second AP device, a message including information about the transmission period and information about the transmission timing,
     transmit, to the terminal, the first BLE advertising packet based on the transmission period and the transmission timing, and
     receive, from the terminal, information for the Wi-Fi connection based on the first BLE advertising packet and the second BLE advertising packet,
   wherein the first BLE advertising packet includes information for calculating throughput of the first AP device and the second BLE advertising packet includes information for calculating throughput of the second AP device.

2. The first AP device of claim 1, wherein the at least one processor is further configured to:
   determine transmission orders of the first BLE advertising packet and the second BLE advertising packet, and
   determine the transmission timing so that the first BLE advertising packet and the second BLE advertising packet are transmitted to the terminal at the predetermined time interval within the identically set transmission period according to the determined transmission orders.

3. The first AP device of claim 1, wherein the at least one processor is further configured to:
   transmit an identification request message to the second AP device,
   receive, from the second AP device, a response message in response to the transmitted identification request message, and
   identify the second AP device based on the received response message.

4. The first AP device of claim 3, wherein the at least one processor is further configured to set at least one identified AP device comprising the identified second AP device into an AP group, and wherein the AP group is coordinated by the first AP device.

5. The first AP device of claim 3, wherein the identification request message and the response message are transmitted through a BLE advertising packet or a Wi-Fi beacon.

6. The first AP device of claim 3, wherein the response message comprises information about a transmission period of the second BLE advertising packet, and
   wherein the at least one processor is further configured to set the transmission period identically for the first BLE advertising packet and the second BLE advertising packet, based on the information about the transmission period of the second BLE advertising packet.

7. A method of coordinating Bluetooth Low Energy (BLE) advertising packet transmission with a second access point (AP) device that transmits a second BLE advertising packet, the method being performed by a first AP device that transmits a first BLE advertising packet, and comprising:
   setting a transmission period identically for the first BLE advertising packet and the second BLE advertising packet;
   determining a transmission timing so that the first BLE advertising packet and the second BLE advertising packet are transmitted to a terminal at a predetermined time interval;
   transmitting, to the second AP device, a message including information about the transmission period and information about the transmission timing;
   transmitting, to the terminal, the first BLE advertising packet based on the transmission period and the transmission timing; and
   receiving, from the terminal, information for a Wireless Fidelity (Wi-Fi) connection based on the first BLE advertising packet and the second BLE advertising packet,
   wherein the first BLE advertising packet includes information for calculating throughput of the first AP device and the second BLE advertising packet includes information for calculating throughput of the second AP device.

8. The method of claim 7, wherein the determining of the transmission timing comprises:
   determining transmission orders of the first BLE advertising packet and the second BLE advertising packet; and
   determining the transmission timing so that the first BLE advertising packet and the second BLE advertising packet are transmitted to the terminal at the predetermined time interval within the identically set transmission period according to the determined transmission orders.

9. The method of claim 7, further comprising:
   transmitting an identification request message to the second AP device;
   receiving from the second AP device, a response message in response to the transmitted identification request message; and
   identifying the second AP device based on the received response message.

10. The method of claim 9, further comprising setting at least one identified AP device comprising the identified second AP device into an AP group,
    wherein the AP group is coordinated by the first AP device.

11. The method of claim 9, wherein the identification request message and the response message are transmitted through a BLE advertising packet or a Wi-Fi beacon.

12. A terminal comprising:
a memory;
a communicator comprising a first communication module configured to receive at least one Bluetooth Low Energy (BLE) advertising packet and a second communication module configured to perform a Wireless Fidelity (Wi-Fi) connection; and
at least one processor configured to:
  receive, from a first access point (AP) device, a first BLE advertising packet,
  receive, from a second AP device, a second BLE advertising packet,
  calculate a throughput of the first AP device based on the first BLE advertising packet,
  calculate a throughput of the second AP device based on the second BLE advertising packet,
  determine an AP device with which the Wi-Fi connection is to be performed, among the first AP device and the second AP device, based on the throughput of the first AP device and the throughput of the second AP device, and
  transmit, to the determined AP device, information for the Wi-Fi connection,
wherein the first BLE advertising packet and the second BLE advertising packet are transmitted to the terminal at a predetermined time interval within an identical transmission period, and
wherein the first BLE advertising packet includes information for calculating throughput of the first AP device and the second BLE advertising packet includes information for calculating throughput of the second AP device.

13. The terminal of claim 12, wherein the information for calculating throughput of the first AP device includes at least one of information of transmission power, information of an operating channel band, information of a central frequency, or Wi-Fi load information of the first AP device, and
  wherein the information for calculating throughput of the second AP device includes at least one of information of transmission power, information of an operating channel band, information of a central frequency, or Wi-Fi load information of the second AP device.

14. A method, performed by a terminal, of performing a handoff with an access point (AP) device, the method comprising:
  receiving, from a first access point (AP) device, a first BLE advertising packet
  receiving, from a second AP device, a second BLE advertising packet;
  calculating a throughput of the first AP device based on the first BLE advertising packet;
  calculating a throughput of the second AP device based on the second BLE advertising packet;
  determining an AP device with which a Wireless Fidelity (Wi-Fi) connection is to be performed, among the first AP device and the second AP device, based on the throughput of the first AP device and the throughput of the second AP device; and
  transmitting, to the determined AP device, information for the Wi-Fi connection,
wherein the first BLE advertising packet and the second BLE advertising packet are transmitted to the terminal at a predetermined time interval within an identical transmission period, and
wherein the first BLE advertising packet includes information for calculating throughput of the first AP device and the second BLE advertising packet includes information for calculating throughput of the second AP device.

15. The method of claim 14, wherein the information for calculating throughput of the first AP device includes at least one of information of transmission power, information of an operating channel band, information of a central frequency, or Wi-Fi load information of the first AP device, and
  wherein the information for calculating throughput of the second AP device includes at least one of information of transmission power, information of an operating channel band, information of a central frequency, or Wi-Fi load information of the second AP device.

* * * * *